Feb. 25, 1964  R. KRYSMANSKI  3,122,685
SEMICONDUCTOR RECTIFIER DEVICE, PARTICULARLY OF MINIATURE TYPE
Filed Feb. 5, 1962
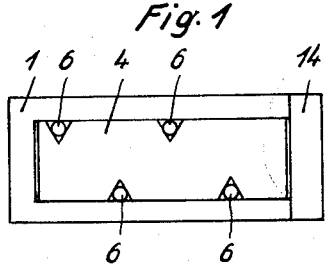
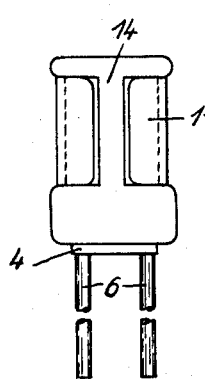
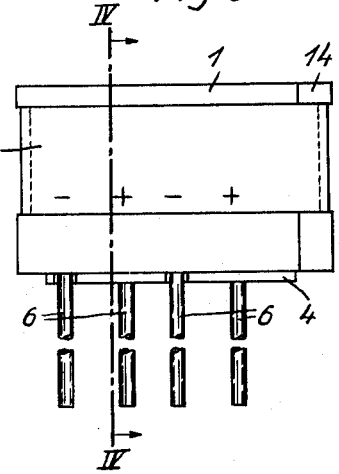
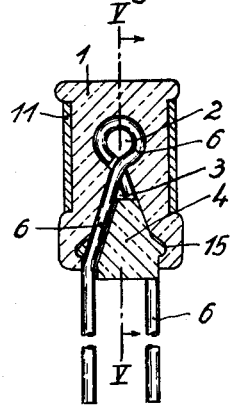
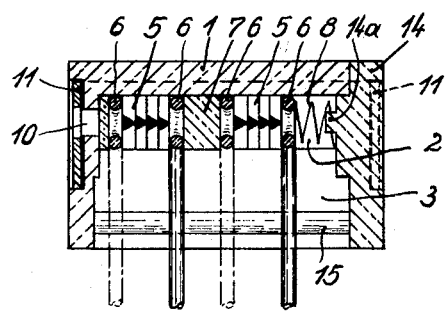
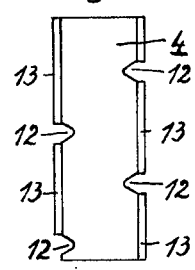
Inventor:
Reiner Krysmanski United States Patent Office 3,122,685
Patented Feb. 25, 1964

3,122,685
SEMICONDUCTOR RECTIFIER DEVICE, PARTICULARLY OF MINIATURE TYPE
Reiner Krysmanski, Berlin-Reinickendorf, Germany, assignor to Siemens-Schuckertwerke Aktiengesellschaft, Berlin-Siemensstadt, Germany, a corporation of Germany
Filed Feb. 5, 1962, Ser. No. 170,955
Claims priority, application Germany Feb. 9, 1961
1 Claim. (Cl. 317—234)

My invention relates to semiconductor rectifier devices, particularly those of miniature type, in which a stack of rectifier tablets is enclosed in an insulating housing and has electric connecting wires which terminate in a loop-shaped portion located in the stack and otherwise extend in an approximately perpendicular direction relative to the stack axis to the outside of the housing.

Such rectifier devices have the advantage that the internal components can be inserted from the side through corresponding openings of the housing so that the assembling of the device involves but a relatively small amount of work. However, they also possess the disadvantage that when the external portions of the connecting wires are being bent, such as for mounting or attaching purposes, the forces and moments applied to the wires may be transmitted to the stack and may impair the contact engagement between the elements of the stack. For minimizing such defects it has been proposed to bend the connecting wires within the housing in a plane perpendicular to the planes of the rectifier tablets and to pass the connecting wires at the bending location through adjacent housing walls so that forces and moments acting from without on the wires are taken up by the housing outside of the rectifier stack.

It is an object of my invention to afford a better protection from external forces by means of a simpler and more reliable construction.

To this end, and in accordance with a feature of my invention, the insulating housing of the rectifier device is closed by an insulating insert at the side where the connecting wires pass from the stack of rectifier tablets to the outside of the housing, the insert protruding into the housing. Furthermore, I provide wedge-shaped grooves in the boundary area between the insert and the adjacent walls of the housing in which grooves the connecting wires are clamped fast when the insert is being inserted into the housing. The wedge-shaped grooves may be provided either in the insert or in the adjacent parts of the housing. Their cross section is preferably somewhat smaller than a triangle circumscribed about the cross section of the connecting wire.

According to another feature of my invention the insert is preferably given the shape of a wedge. It can then be readily inserted and pressed into the housing. According to another feature, the insert and the adjacent housing portions are preferably provided with projections and recesses respectively which catch into each other when the insert is fully pressed into the housing, so as to then latch the insert in assembled condition.

The above-mentioned and further objects, advantages and features of my invention will be apparent from, and will be mentioned in, the following description of the rectifier device illustrated by way of example on the accompanying drawing in which:

FIG. 1 is a bottom view, FIG. 2 a lateral view and FIG. 3 a front view of a miniature-type rectifier device;

FIG. 4 is a cross section along the line IV—IV in FIG. 3;

FIG. 5 is a longitudinal section along the line V—V in FIG. 4, the above-mentioned insert being removed from the housing;

FIG. 6 is a bottom view and FIG. 7 a lateral view of the insert.

The rectifier device shown on the illustrations comprises two rectifying systems composed of selenium tablets in one-way connection. The scale of illustration is greatly enlarged. In reality, the tablets have a diameter of but a few millimeters. The forward (conducting) direction of each tablet is symbolically indicated by a black arrowhead.

The enclosure of the illustrated device comprises a housing 1 of insulating material, consisting for example of a polycarbonate synthetic substance. The housing body has a cylindrical channel 2 into which the components of the internal equipment are stacked, these components comprising the rectifier tablets 5, an intermediate insulating plate 7, and connecting wires 6. The channel 2 communicates with a wedge-shaped space 3 that widens downwardly toward the outside. After the internal components are stacked into the channel 2, a wedge-shaped insert 4 is inserted into the space 3. The insert 2 consists of insulating material, for example a polyethylene plastic.

The composition of the rectifier systems is best apparent from FIG. 5. Each individual one-way rectifier system comprises a stack of four selenium tablets 5 bordering on both sides with respective connecting members 6. Each connecting member 6 consists of a wire having a single stem which is bent to a loop at one end as shown in FIG. 4, the loop being in contact with the adjacent tablet 5. The two one-way systems are separated by the insulating plate 7. The entire stack assembly is biased by a helical spring 8 located at the right-hand end of the stack and providing for the required contact pressure.

All internal components are placed into the channel 2 from one side of the housing 1, namely from the right of FIG. 5. To facilitate assembling, the housing body 1 is provided with an opening 10 at the opposite side. During assembling a pin (not illustrated) protrudes through the opening 10 into the channel 2. The individual components are then placed upon the front face of the pin and the pin is gradually pressed out of the housing with the progressing build-up of the stack.

After the last component, namely the contact spring 8, is inserted, the right side of the housing relative to FIG. 5 is closed by a cover 14 which has a projecting portion protruding into the channel 2. The cover 14 possesses another projection 14a of smaller diameter which engages the inner space of the helical spring 8 and thus constitutes an abutment and guide for the spring. The housing body 1 and the cover 14 are clamped together by a metal tape 11 which already may surround the housing, with the exception of the cover 14, while the inner components are being filled into the channel 2. The tape, for that reason, is provided with a hole adjacent to the opening 2.

At the assembling stage now reached, the device is still downwardly open and corresponds to the showing in FIG. 5. The final closure is effected by pushing the wedge-shaped insert 4 into the hollow space 3. According to FIGS. 6 and 7, the wedge-shaped insert 4 has its two inclined surfaces provided with two likewise wedge-shaped grooves 12 which serve to receive the outwardly extending portions of the connecting wires 6. The cross section of the grooves 12 is preferably made somewhat smaller and corresponds to a triangle circumscribed about the circular cross section of the connecting wire. The wedge-shaped insert 4 is further provided with protruding shoulders 13 which extend over the entire length of the insert. When the wedge insert 4 is shoved into the hollow space 3 of the housing 1, the shoulders 3 catch into undercut recesses 15 in the lateral walls of the housing body 1 (FIG. 4). At the same time, the outwardly extending parts of the connecting wire 6 enter into the grooves 12 in which they are so firmly clamped by the spring action of the housing body 1, that any forces and moments imposed upon the external connecting wires during use of the rectifier device are caught and are thus prevented from reaching the rectifier stack.

I claim:

A semiconductor rectifier device comprising an insulating housing member having one side open when in unassembled condition, a stack of rectifier elements in said housing member, terminal wires having respective loop portions adjacent to elements in said stack and extending from said loop portions approximately in respective radial planes of said stack through said open side to the outside of said housing member, an insulating insert member which closes said open side of said housing member, when assembled therewith, one of said members having wedge-shaped grooves facing the other member and clampingly engaging said terminal wires when joining said two members, said housing member having an opening on a lateral side parallel to said planes for insertion of said stack when assembling the device, and an insulating cover fastened in said opening in assembled condition of the device.

References Cited in the file of this patent

UNITED STATES PATENTS

| | | |
|---|---|---|
| 2,017,842 | Conant | Oct. 22, 1935 |
| 2,665,329 | Brennan | Jan. 5, 1954 |
| 2,966,620 | Bonnano | Dec. 27, 1960 |
| 2,999,963 | Schneider | Sept. 12, 1961 |
| 3,011,138 | Antalek | Nov. 28, 1961 |